United States Patent
Kakutani

(10) Patent No.: US 9,202,151 B2
(45) Date of Patent: Dec. 1, 2015

(54) PRINTING APPARATUS, CONTROL METHOD THEREOF, CONTROL PROGRAM THEREOF, AND MANUFACTURING METHOD OF PRINTING MATERIAL

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/134,349

(22) Filed: Dec. 19, 2013

(65) Prior Publication Data
US 2014/0177003 A1    Jun. 26, 2014

(30) Foreign Application Priority Data
Dec. 20, 2012 (JP) .................................. 2012-277653

(51) Int. Cl.
*G06K 15/00* (2006.01)
*H04N 1/405* (2006.01)
*G06K 15/02* (2006.01)

(52) U.S. Cl.
CPC .......... *G06K 15/1881* (2013.01); *H04N 1/4051* (2013.01)

(58) Field of Classification Search
USPC .......................... 358/3.1, 3.13, 1.9, 3.01, 3.14
See application file for complete search history.

(56) References Cited

U.S. PATENT DOCUMENTS

| 2006/0044616 A1* | 3/2006 | Satoh et al. ................... 358/3.01 |
| 2006/0193010 A1* | 8/2006 | Kakutani ..................... 358/3.13 |

FOREIGN PATENT DOCUMENTS

JP    2007-015359 A    1/2007

* cited by examiner

*Primary Examiner* — Quang N Vo
(74) *Attorney, Agent, or Firm* — Global IP Counselors, LLP

(57) ABSTRACT

A printing apparatus is provided with a CPU. The CPU generates dot data where dots are regularly distributed and arranged in a case where gradation values which are represented by image data are a predetermined value or less by using a dither mask where thresholds are set for each printing pixel and comparing the gradation values of each of the pixels which configure the original image and the thresholds for each of the printing pixels which are set in the dither mask, and generates the dot data such that the degree of regularity of the dots which are distributed and arranged is reduced as the gradation values are increased in a case where the gradation values which are represented by the image data exceed the predetermined value through execution of a dot data generating module.

6 Claims, 9 Drawing Sheets

PRINTING APPARATUS, CONTROL METHOD THEREOF, CONTROL PROGRAM THEREOF, AND MANUFACTURING METHOD OF PRINTING MATERIAL

CROSS-REFERENCE TO RELATED APPLICATIONS

This application claims priority to Japanese Patent Application No. 2012-277653 filed on Dec. 20, 2012. The entire disclosure of Japanese Patent Application No. 2012-277653 is hereby incorporated herein by reference.

BACKGROUND

1. Technical Field

The present invention relates to a technique where an image is printed by forming dots on a printing medium.

2. Background Technology

Printing apparatuses which print images by forming dots on a printing medium are widespread. In such printing apparatuses, the dots are formed on the printing medium and the images are printed by discharging ink from a head at an appropriate timing while reciprocating the head above the printing medium. The gradation expression of the image is obtained by changing the number of white and black dots over an area with a certain fixed area set as a unit. A systematic dither method is known as such a method. In the systematic dither method, for example, in a case where 17 gradations are expressed, 4 pixels×4 pixels are set as one unit and it is determined whether dots are formed for each of the pixels by using a dither mask where 16 thresholds from 1 to 16 are arranged and comparing the image signal and the thresholds.

In a blue noise mask which is a typical example of a high image quality dot distribution dither mask, the thresholds are arranged such that the image has a blue noise characteristic when the image is binarized using the dither mask. This is because the dots become less conspicuous due to peaks of the spatial frequency characteristics of the image being set to come in a region with high spatial frequency where human visual sensitivity is reduced.

Japanese Laid-open Patent Publication No. 2007-15359 (Patent Document 1) is an example of the related art.

SUMMARY

Problems to be Solved by the Invention

Here, the dither mask with the blue noise characteristic described above is appropriate for printing such as photographs, but there are cases in applications such as label printing where granularity of the dots is conspicuous compared to offset printing which uses half-tone dots. Since the positions of the dots are fixed and the gradation is expressed by the size of the dots in printing using half-tone dots, the dots which are arranged irregularly are less conspicuous even when a predetermined color is printed over a large area. However, since the dots are arranged at random in the gradation expression which uses the dither mask with the blue noise characteristic, the irregularities can be conspicuous and seem out of place in a case where the dots are formed to be spread out. In particular, there are problems in cases where magenta or cyan dots are formed to be spread out on a yellow background. On the other hand, when the thresholds are determined in the dither mask such that the dots are regularly arranged for all the gradations, the changes in the dot pattern are recognized as pseudo contours and the print quality decreases in cases of changing from a certain gradation to the next gradation. The invention was carried out in view of the circumstances described above and solves the problem of providing a printing apparatus and the like which improves irregularities in cases where dots are formed to be spread out while suppressing a dot pattern from being visually recognized.

Means Used to Solve the Above-Mentioned Problems

A printing apparatus according to the invention for solving the problems described above performs printing onto a printing medium and is provided with a dot data generating section which generates dot data which indicates a dot formation state for each printing pixel in a printing image which is to be formed on the printing medium by performing a half-toning process with regard to image data which represents gradation values of each pixel which configures an original image, and a printing image generating section which generates a printing image by forming dots at each of the printing pixels according to the dot data, where the dot data generating section generates the dot data where the dots are regularly distributed and arranged by using a dither mask where thresholds are set for each of the printing pixels and comparing the gradation values of each of the pixels which configure the original image and the thresholds for each of the printing pixels which are set in the dither mask in a case where the gradation values which are represented by the image data are a predetermined value or less, and generates the dot data such that the degree of regularity of the dots which are distributed and arranged is reduced as the gradation values increase in a case where the gradation values which are represented by the image data exceed the predetermined value.

According to the invention, the thresholds in the dither mask are assigned such that the dots are regularly distributed and arranged in a case where the gradation values which are represented by the image data are a predetermined value or less, and the dot data are generated such that the degree of regularity of the dots which are distributed and arranged is reduced as the gradation values increase in a case where the gradation values which are represented by the image data exceed the predetermined value. As a result, it is possible to reduce irregularities in a case where the dots are formed to be spread out while suppressing a dot pattern from being visually recognized and it is possible to significantly improve printing quality.

In the printing apparatus described above, it is preferable that, in a case where the gradation values which are represented by the image data exceed the predetermined value, the presence or absence of dot forming for each of the printing pixels be determined according to the gradation values of each of the pixels which configure the original image and the thresholds for each of the printing pixels which are set in the dither mask by using the dither mask where thresholds are set for each of the printing pixels in the half-toning process, and the thresholds for each of the printing pixels be set for the gradation values which exceed the predetermined value in the dither mask such that the distribution of the dots which are formed on the printing medium approaches a blue noise characteristic or a green noise characteristic as the gradation values increase.

According to the invention, it is possible to reduce the visual recognition of the dot pattern for gradation values which exceed the predetermined value since the thresholds are set for each of the printing pixels such that the distribution of dots which are formed on the printing medium approaches the blue noise characteristic or the green noise characteristic.

In the printing apparatus described above, it is preferable that the printing image generating section form the printing image on the printing medium using at least inks of each color of yellow, magenta and cyan and that the half-toning process be executed when forming dots of at least cyan or magenta. In a case where dots of magenta or cyan are formed to be spread out with yellow as the background, the dots of magenta or cyan can seem out of place when the dots are arranged irregularly. According to the invention, since the dots of magenta or cyan are formed to be regularly distributed and arranged in a case where the low gradation is expressed, it is possible to improve printing quality.

Next, it is possible for the invention to take the form of a method of manufacturing printing material. The manufacturing method is a method of manufacturing printing material which manufactures printing material by forming a printing image on a printing medium and includes generating dot data which indicates a dot formation state for each printing pixel of the printing image which is to be formed on the printing medium by performing a half-toning process with regard to image data which represents gradation values of each pixel which configures an original image, printing the printing image on the printing medium by forming dots at each of the printing pixels according to the dot data, and generating the dot data where the dots are regularly distributed and arranged by using a dither mask where thresholds are set for each of the printing pixels and comparing the gradation values of each of the pixels which configure the original image and the thresholds for each of the printing pixels which are set in the dither mask in a case where the gradation values which are represented by the image data are a predetermined value or less and generating the dot data such that the degree of regularity of the dots which are distributed and arranged is reduced as the gradation values increase in a case where the gradation values which are represented by the image data exceed the predetermined value, in the half-toning process.

Next, it is possible for the invention to take the form of a control method for a printing apparatus. The control method for a printing apparatus is a method where a printing apparatus which performs printing on a printing medium is controlled and includes generating dot data which indicates a dot formation state for each printing pixel of the printing image which is to be formed on the printing medium by performing a half-toning process with regard to image data which represents gradation values of each pixel which configures an original image, and printing a printing image on the printing medium by forming dots at each of the printing pixels according to the dot data, and generating the dot data where the dots are regularly distributed and arranged by using a dither mask where thresholds are set for each of the printing pixels and comparing the gradation values of each of the pixels which configure the original image and the thresholds for each of the printing pixels which are set in the dither mask in a case where the gradation values which are represented by the image data are a predetermined value or less and generating the dot data such that the degree of regularity of the dots which are distributed and arranged is reduced as the gradation values increase in a case where the gradation values which are represented by the image data exceed the predetermined value, in the half-toning process.

Next, it is possible for the invention to take the form of a control program for a printing apparatus. A control program for a printing apparatus is a control program for a printing apparatus which performs printing onto a printing medium and is provided with a printing image generating section, which generates a printing image by forming dots at each printing pixel, and a computer, by the computer functioning as a control unit and includes controlling a dot data generating section which generates dot data which indicates a dot formation state for each of the printing pixels in the printing image which is to be formed on the printing medium by performing a half-toning process with regard to image data which represents gradation values of each pixel which configures an original image, and the printing image generating section so as to generate a printing image by forming dots at each of the printing pixels according to the dot data, and generating the dot data where the dots are regularly distributed and arranged by using a dither mask where thresholds are set for each of the printing pixels and comparing the gradation values of each of the pixels which configure the original image and the thresholds for each of the printing pixels which are set in the dither mask in a case where the gradation values which are represented by the image data are a predetermined value or less and generating the dot data such that the degree of regularity of the dots which are distributed and arranged is reduced as the gradation values increase in a case where the gradation values which are represented by the image data exceed the predetermined value, in the half-toning process.

BRIEF DESCRIPTION OF THE DRAWINGS

Referring now to the attached drawings which form a part of this original disclosure.

DETAILED DESCRIPTION OF EXEMPLARY EMBODIMENTS

A

First Embodiment

Figure 1:
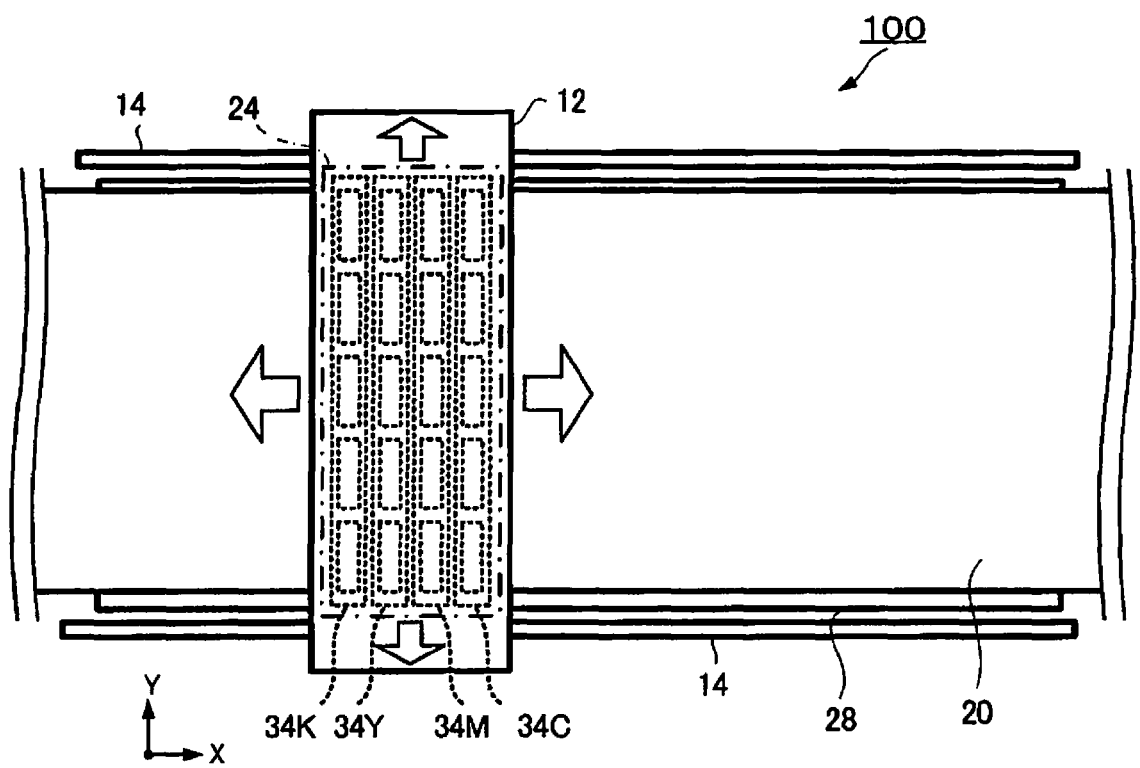
FIG. 1 is a schematic diagram of a printing apparatus according to a first embodiment of the invention.

FIG. 1 is a partial schematic diagram of an ink jet printing apparatus 100 according to the first embodiment of the invention. The printing apparatus 100 adopts an ink jet system where liquid is ejected as a coating onto a continuous sheet (printing medium) 20 from a recording head 24. The printing apparatus 100 performs a printing process while sequentially feeding out the continuous sheet 20 with a long shape which is wound into a roll shape and winds the continuous sheet 20 back into a roll shape after printing. Here, in the present embodiment, the transport direction of the continuous sheet 20 is set as the X direction and the width direction of the continuous sheet 20 in a horizontal plane which is perpendicular with the X direction is set as the Y direction.

The continuous sheet 20 is guided to a platen (support member) 28 which is fixed on a base. A carriage 12 which supports the recording head 24 is provided above the platen 28. The carriage 12 is supported by two guide shafts 14. The two guide shafts 35 are arranged in parallel with each other along the transport direction (the Y direction) and are configured such that it is possible for the carriage 12 to move in a reciprocal manner in the transport direction.

A suction fan is connected with the platen 28 and it is possible to exert a suction force on the continuous sheet 20 via numerous suction holes which are formed in the platen 28. Due to this, it is possible to flatten the continuous sheet 20 using adsorption. In addition, a heater (which is not shown in the diagram) is provided in the platen 28 and it is possible to promote the drying of ink which lands on the surface of the continuous sheet 20 which is adsorbed onto the platen 28 as the recording is executed.

A supply transport system where a plurality of transport rollers are included is provided at the upstream side (−Y side) of the platen 28 in the transport direction. The supply transport system in the present embodiment intermittently transports the continuous sheet 20 on the platen 28 by a predetermined range at a time. The recording head 24 is configured so as to be able to move in the medium width direction (the X direction) on the carriage 12. The recording head 24 carries out positional control in the medium width direction (the X direction) and positional control in the medium transport direction (the Y direction or the head scanning direction) of the carriage 12.

Figure 2:
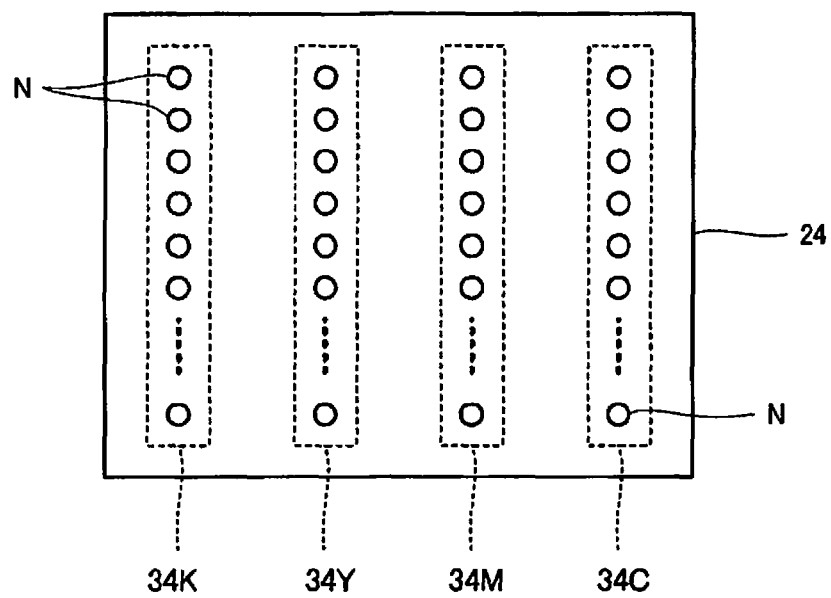
FIG. 2 is a planar diagram of a discharge surface of a recording head.

In addition, the recording head 24 is provided with a head 34K which discharges black ink, a head 34Y which discharges yellow ink, a head 34M which discharges magenta ink, and a head 34C which discharges cyan ink. The head 34K, the head 34Y, the head 34M, and the head 34C are each connected with an ink tank via ink supply tubes (not shown in the diagram). Numerous ink discharging nozzles N are disposed on the lower surface (the nozzle forming surface) of the recording head 24 in the medium transport direction (the X direction) as shown in FIG. 2. The recording head 24 is provided with pressure chambers which correspond to each of the ink discharging nozzles N and which link to the ink discharging nozzles N and piezoelectric elements which change the volume of the pressure chambers. Due to driving signals being supplied to the piezoelectric elements, the pressure in the pressure chambers is changed, ink is ejected from the ink discharging nozzles N toward the continuous sheet 20 on the platen 28, and printing is performed.

Figure 3:
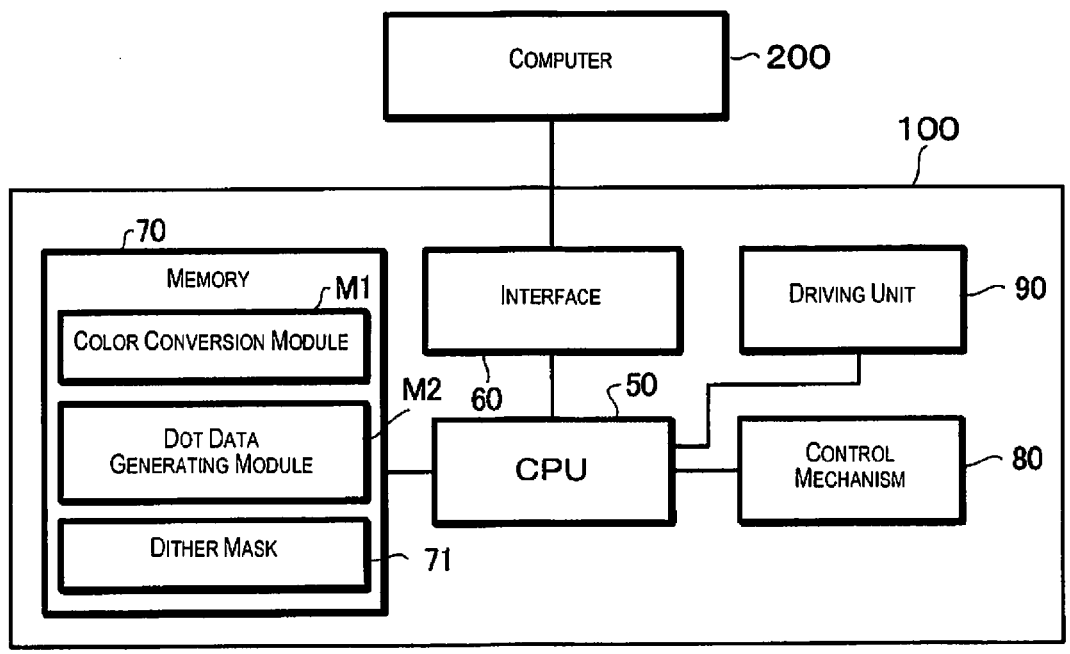
FIG. 3 is a block diagram of an electrical configuration of the printing apparatus.

FIG. 3 is a block diagram illustrating the electrical configuration of the printing apparatus 100. As shown in FIG. 3, the printing apparatus 100 includes a CPU 50 which functions as a control center of the entire apparatus, an interface 60 which takes in image data from a computer 200 which is an external apparatus and supplies the image data to the CPU 50, a memory 70 which stores a control program such as a dither mask 71, a color conversion module M1, a dot data generating module M2 and the like and functions as an working region for the CPU 50, a control mechanism 80 which moves the carriage 12 in the X direction, moves the recording head 24 in the Y direction, and moves the continuous sheet 20 based on instructions from the CPU 50, and a driving unit 90 which outputs a driving signal which drives the recording head 24 based on the dot data from the CPU 50. The driving unit 90 functions as the printing image generating section which generates a printing image by forming dots at each of the printing pixels according to the dot data.

Figure 4:
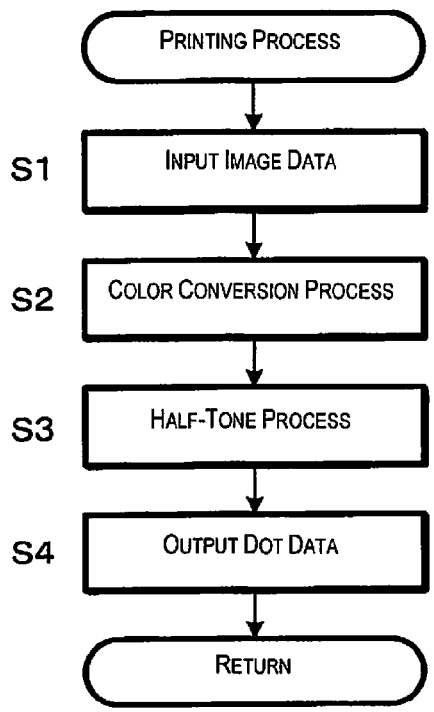
FIG. 4 is a flow chart illustrating the contents of a printing process.

FIG. 4 is a flow chart of a printing process which is executed by the CPU 50. This printing process is performed by the CPU 50 as hardware executing a program. When the printing process is started, the CPU 50 inputs RGB format image data from the computer 200 (step S1). When the image data is input, the CPU 50 converts the RGB format image data to CMYK format image data using the color conversion module M1 (step S2).

When the CMYK format image data is obtained, the CPU 50 performs a half-tone process for each of the colors of cyan (C), magenta (M), yellow (Y), and black (K) using the dot data generating module M2 and generates the dot data (step S3), and outputs the dot data to the driving unit 90 (step S4). The dot data indicates a dot formation state for each of the printing pixels in the printing image which is to be formed on the continuous sheet (the printing medium). The dot formation state is a concept which includes the size of the dots in addition to the presence or absence of the dots. However, the dot data in the present embodiment indicates the presence or absence of the dots in the printing pixels in order to simplify the description.

The CPU 50 functions as the dot data generating section by executing the dot data generating module M2. Firstly, the dot data generating section generates the dot data where the dots are regularly distributed and arranged by using the dither mask 71 where thresholds are set for each of the printing pixels and comparing the gradation values of each of the pixels which configure the original image and the thresholds for each of the printing pixels which are set in the dither mask 71 in a case where the gradation values which are represented by the image data are the predetermined value or less. Secondly, the dot data generating section generates the dot data such that the degree of regularity of the dots which are distributed and arranged is reduced as the gradation values increase in a case where the gradation values which are represented by the image data exceed the predetermined value.

In label printing, what is problematic in cases where the thresholds are assigned in the dither mask such that a blue noise characteristic is obtained is that there are cases where the gradation values which are indicated by the image data are small and the dots are formed to be spread out. Therefore, in the present embodiment, in cases where the gradation values which are indicated by the image data are the predetermined value or less, the thresholds are assigned in the dither mask 71 such that the dots are distributed and arranged regularly. For example, in a case where 256 gradations are expressed, the predetermined value is "8".

Figure 5:
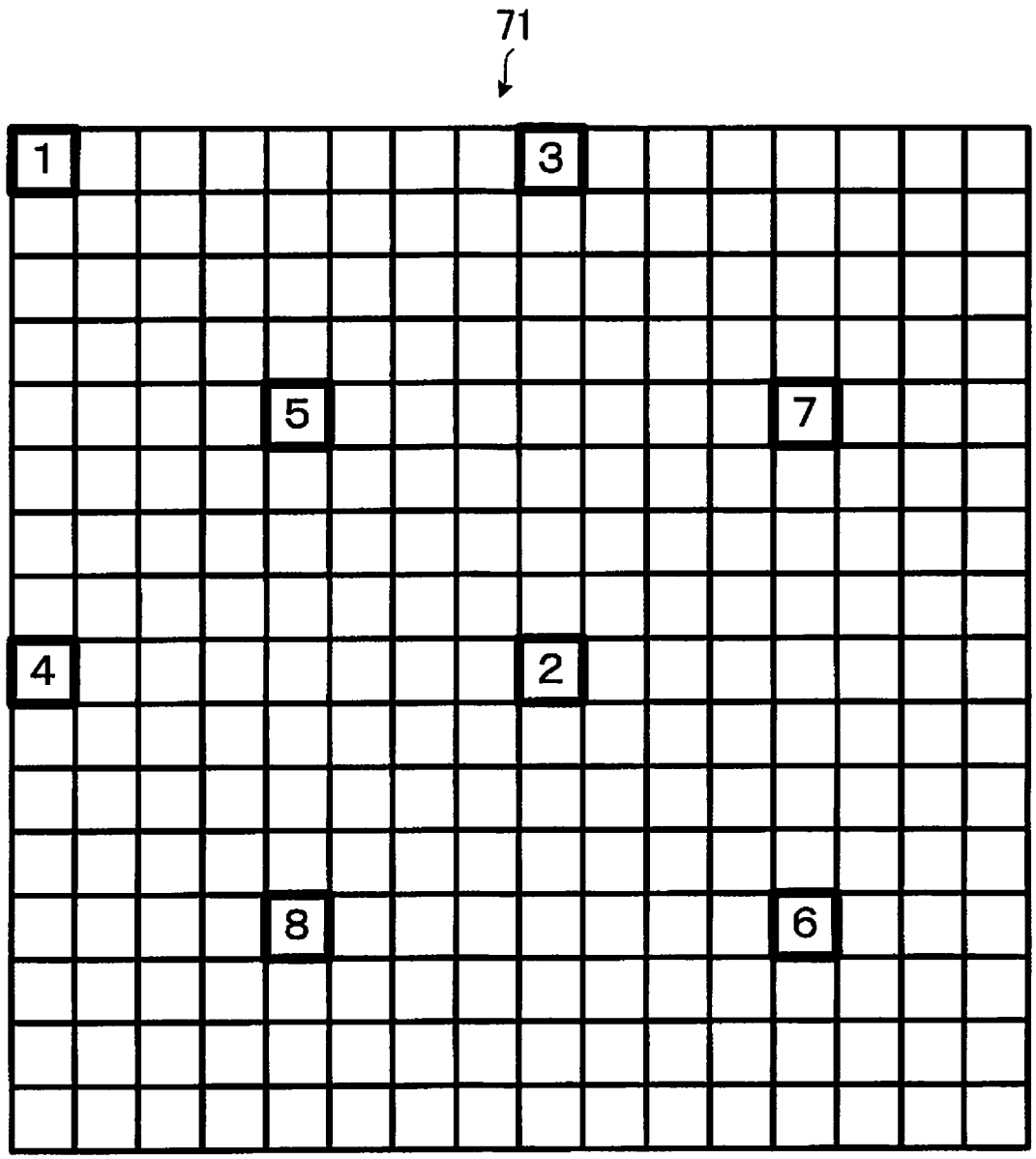
FIG. 5 is an explanatory diagram illustrating an example of a dither mask which is used in the first embodiment.

FIG. 5 illustrates an example of the dither mask 71 where thresholds which are 8 or less are assigned. FIG. 5 illustrates a portion of a dither mask with a size of 256 pixels vertically and 256 pixels horizontally and a region with a size of 16 pixels vertically and 16 pixels horizontally. Then, the thresholds "1" to "8" are assigned to the pixels which are surrounded by thick lines. In this example, the printing pixels which are assigned with the thresholds "1" to "8" are arranged at positions which are shifted by 4 pixels in a diagonal direction and become a repeating pattern where the 16 pixels vertically and 16 pixels horizontally are set as one unit relating to the 8 or less thresholds. Since the thresholds which are the predetermined value or less are arranged based on a Bayer array, the dots are regularly distributed and arranged. Due to this, it is possible to improve the irregularities in the dot arrangement even in a case where the gradation values which are indicated by the image data are small and the dots are formed to be spread out.

In addition, in a case where the gradation values which are represented by the image data exceed "8" which is the predetermined value, thresholds of 9 or more are assigned in the dither mask 71 such that the degree of regularity of the dots which are distributed and arranged is reduced as the gradation values increase. In more detail, the thresholds are assigned in the dither mask 71 such that the arrangement of the dots approaches the blue noise characteristic as the gradation values increase. In this case, for the thresholds of 9 or more, it is sufficient to determine which of the printing pixels are assigned with the thresholds in the dither mask 71 using an evaluation function where the regular pattern is separated and the blue noise characteristics is optimized. Due to this, with a dot duty which exceeds 8/256, it is possible to realize the dither mask 71 where there is gradual convergence to the blue noise characteristic. As a result, it is possible to suppress the dot pattern from being visually recognized.

Figure 6:
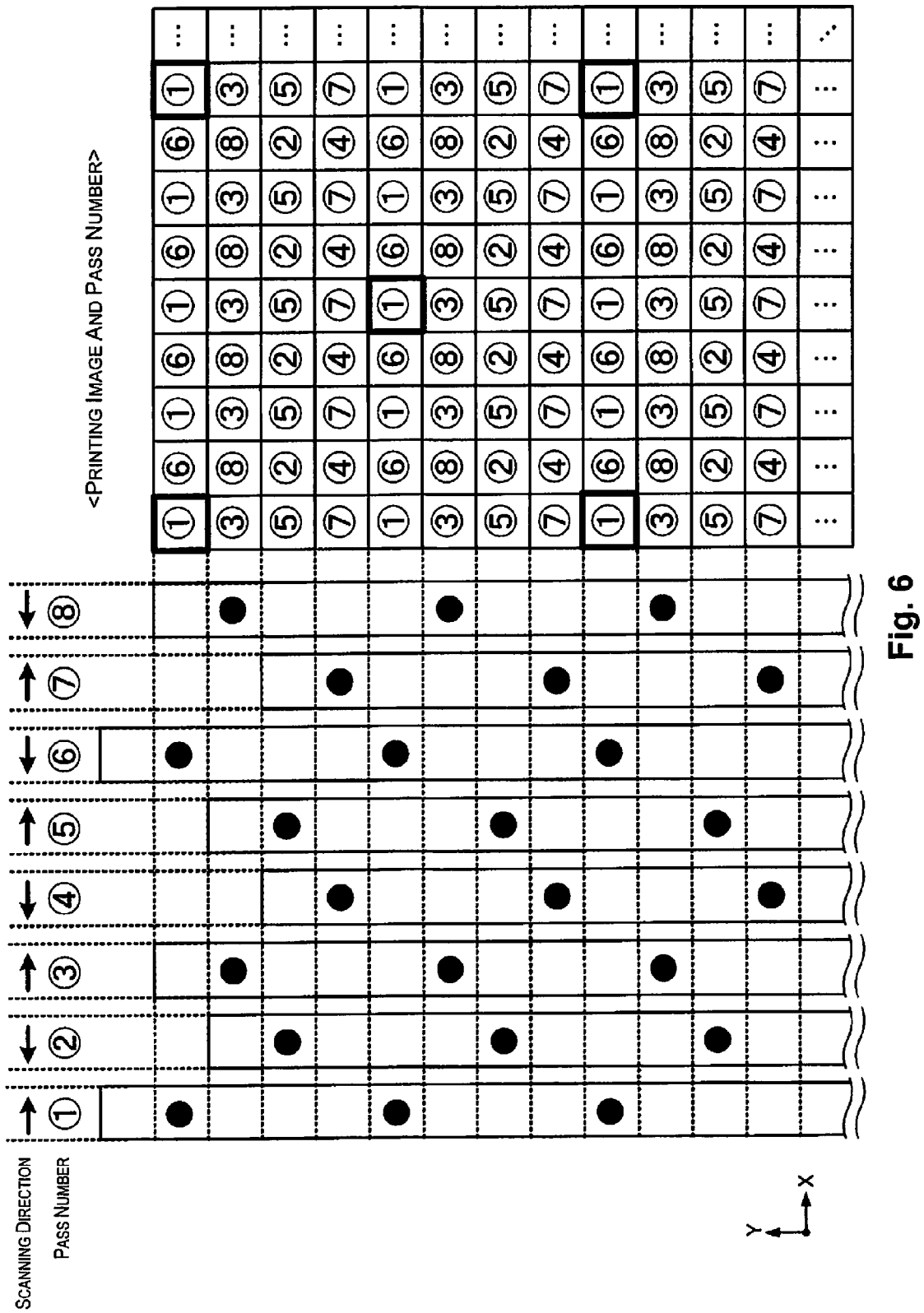
FIG. 6 is an explanatory diagram for describing a relationship between the printing pixels and pass numbers in the first embodiment.

Next, the relationship between the scanning of the recording head 24 and the printing pixels which are assigned with the thresholds of the predetermined value or less will be described. FIG. 6 illustrates a relationship between the printing pixels and the pass number. Here, in this example, in order to simplify the description, the description focuses on the cyan head 34C or the magenta head 34M, but the same applies to the other colors.

The recording head 24 of the present embodiment performs scanning (referred to below as passes) in both directions. The arrows shown in the diagram indicate the scanning direction. In addition, the pass numbers indicate the order of the passes. In this example, the recording head 24 is moved in the X direction which is illustrated in FIG. 1 using odd numbered passes and the recording head 24 is moved in the −X direction which is illustrated using even numbered passes. Furthermore, the recording head 24 moves and scans only 2 printing pixels in the −Y direction in pass number 2 compared to pass number 1, the recording head 24 moves and scans only 1 printing pixel in the Y direction in pass number 3 compared to pass number 2, the recording head 24 moves and scans only 2 printing pixels in the −Y direction in pass number 4 compared to pass number 3, the recording head 24 moves and scans only 1 printing pixel in the Y direction in pass number 5 compared to pass number 4, the recording head 24 moves and scans only 2 printing pixels in the Y direction in pass number 6 compared to pass number 5, the recording head 24 moves and scans only 3 printing pixels in the −Y direction in pass number 7 compared to pass number 6, and the recording head 24 moves and scans only 2 printing pixels in the Y direction in pass number 8 compared to pass number 7.

As a result, dots are formed for each of the printing pixels by the pass with the pass number which is illustrated by the circled number in the diagram. Here, the printing pixels which are assigned with the thresholds of the predetermined value or less which are shown in FIG. 5 are the printing pixels which are surrounded by the thick lines in FIG. 6 and are all formed in the pass which is pass number 1. By being set as the same pass in this manner, there are the following advantages when expressing gradations with a low duty of 8/256 or less, compared to a case where the dots are formed by being distributed over a plurality of passes. Firstly, since the passes are the same, deviation in the landing position due to the passes being different is eliminated. In particular, when the continuous sheet 20 expands due to ink being absorbed or contracts due to the drying mechanism, the deviation in the landing positions between passes increases and the dot arrangement is disturbed, but this no longer has an effect. Secondly, since it is possible to form the dots earlier than in other passes due to pass number 1 being assigned, there are few disturbances in the dot shapes caused by bleeding due to contact with dots which are formed by other passes and by nozzles of other colors.

According to the present embodiment, the thresholds in the dither mask 71 are assigned such that the dots are regularly distributed and arranged in a case where the gradation values which are represented by the image data are the predetermined value or less, and the thresholds in the dither mask 71 are assigned such that the degree of regularity of the dots which are distributed and arranged is reduced as the gradation values increase in a case where the gradation values which are represented by the image data exceed the predetermined value. As a result, it is possible to reduce irregularities in a case where the dots are formed to be spread out while suppressing a dot pattern from being visually recognized and it is possible to significantly improve printing quality.

B

Second Embodiment

In the first embodiment described above, in a case where the gradation values which are indicated by the image data are the predetermined value or less, thresholds are assigned to the dither mask 71 such that the dots are regularly distributed and arranged. In contrast to this, the printing apparatus 100 according to the second embodiment is different in that a dither mask 72 where thresholds are assigned such that there are fluctuations in the dots which are arranged regularly is used in a case where the gradation values which are indicated by the image data are the predetermined value or less.

Figure 7:
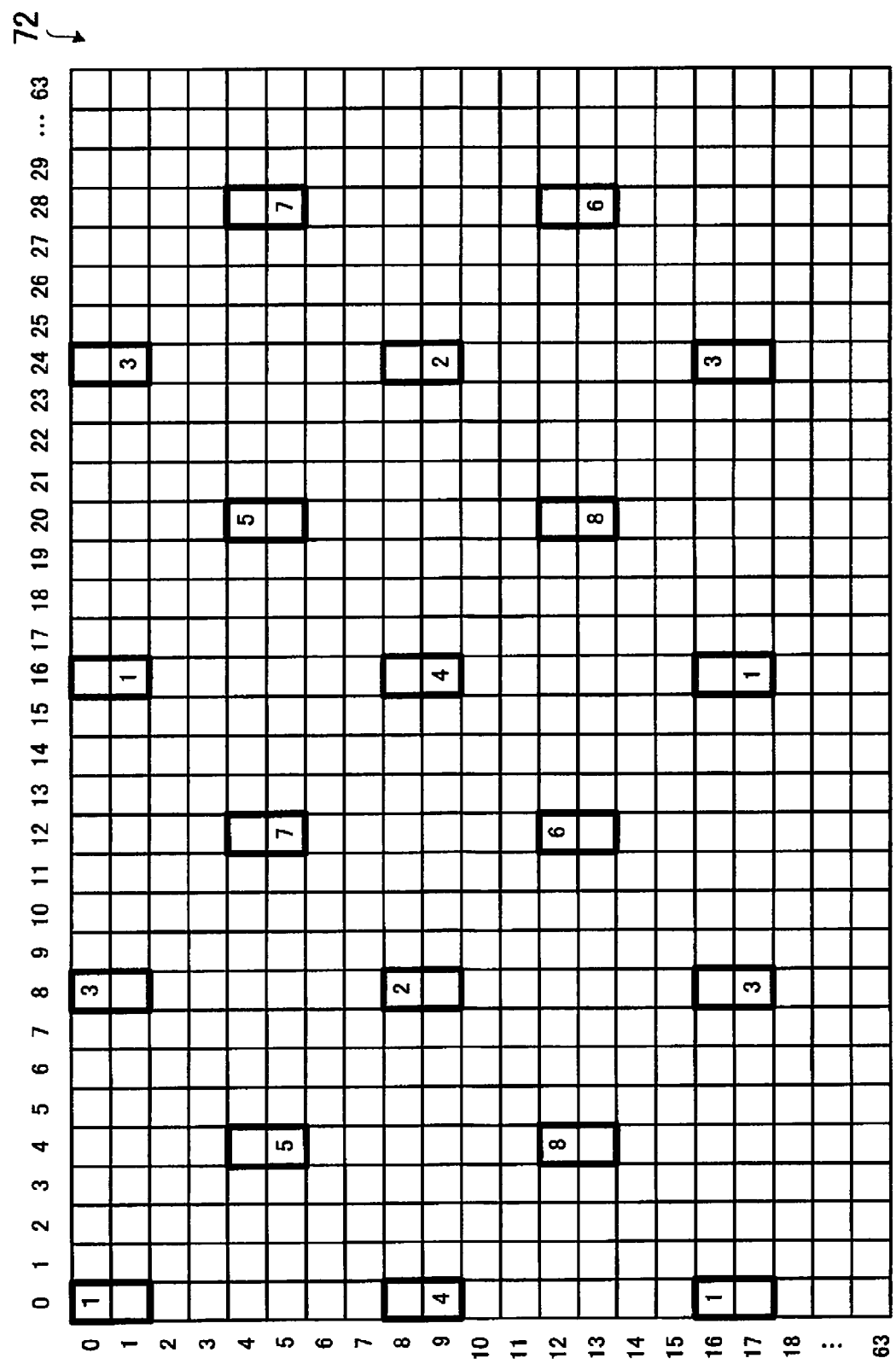
FIG. 7 is an explanatory view illustrating an example of a dither mask which is used in a second embodiment.

FIG. 7 illustrates the dither mask 72 which is used in the second embodiment. The dither mask 72 shows a portion of the dither mask with 256 gradations at a size where the number of gradations is 256 pixels vertically×256 pixels horizontally in the same manner as the dither mask 71 shown in FIG. 5, and in order to add random fluctuations, the size of the repeated pattern of the thresholds which are 8 or less is enlarged to 64 pixels horizontally×64 pixels vertically. Here, increasing the size of the repeated pattern to match the size of the dither mask is preferable from the point of view of adding random fluctuations.

Figure 8:
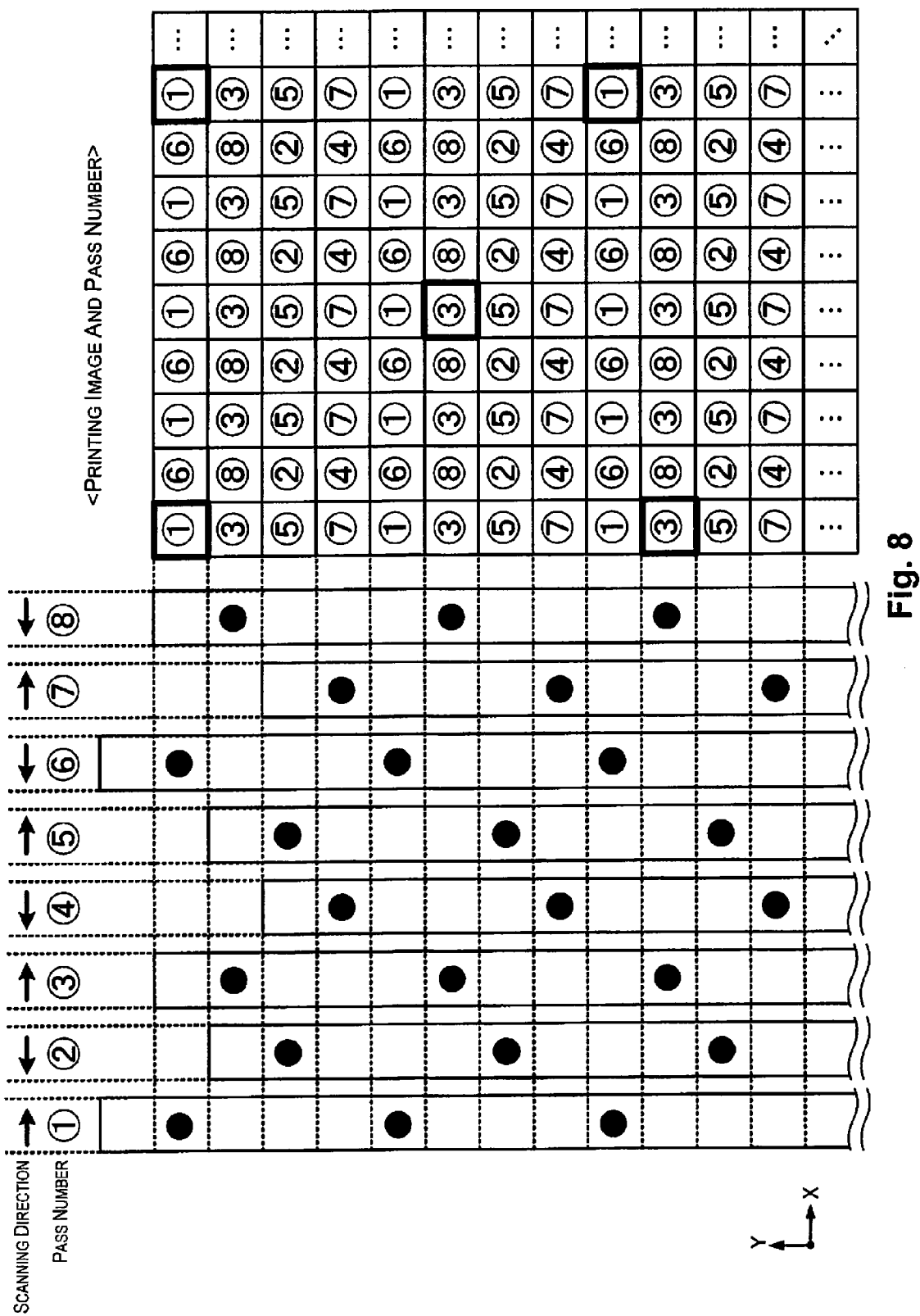
FIG. 8 is an explanatory diagram for describing a relationship between the printing pixels and pass numbers in the second embodiment.

In the example shown in FIG. 7, a fluctuation of one pixel directly below is added with regard to the dither mask 71. That is, thresholds of a predetermined value or less are assigned to either of two printing pixels which are surrounded by thick lines in FIG. 7. In this example, the dot arrangement is based on a Bayer arrangement when there is a low duty of 8/256 or less. In this case, as shown in FIG. 8, the printing pixels which are assigned with the thresholds of the predetermined value or less are printing pixels which are surrounded by a thick line and are formed by the passes which are pass number 1 and pass number 3. The selection of the passes which are pass number 1 and pass number 3 in this manner is for the following reasons.

Firstly, since the scanning order is early, there are few disturbances in the dot shapes. That is, a pass which is not easily affected by bleeding due to other inks is preferable. Secondly, since the scanning directions are the same, the amount of deviation in the landing positions follows the same trend and it is possible to reduce the deviation in the relative landing positions. Thirdly, since the scanning order is close, deviation in the landing positions of the ink is reduced due to not being easily affected by the expansion and contraction of the continuous sheet 20. That is, the continuous sheet 20 which absorbs ink expands in the time from the pass which is pass number 1 to the pass which is pass number 8 and the continuous sheet 20 can also contract due to the drying in a case where a drying mechanism is included. Deviation in the landing positions between passes is generated due to this effect. In the present embodiment, in order to minimize this effect, continuous pass are chosen from among the passes with the same scanning direction. Fourthly, the regular pattern is moderately disturbed due to the fluctuations, but the shortest distance of the pixel positions is appropriate.

In this manner, since the dots are generated to be randomly mixed by selecting two passes from the plurality of passes to set a quasi-regular pattern where fluctuation is added with regard to the complete regular pattern (refer to FIG. 5), it is possible to have an allowance even when there is deviation in the landing positions of the ink. In a case where there is no deviation in the landing positions of the ink, granularity of the complete regular pattern is optimum.

However, due to the variation or the like in the positions of the ink discharging nozzles N, a portion of the ink discharging nozzles N can deviate from the complete regular pattern with the effect of there being deviations in the landing positions. In this case, even if the deviations are slight, this portion generates streaks or the like in the printing image which are easily recognized.

According to the present embodiment, since the quasi-regular pattern where the fluctuations are added to the regular pattern is adopted, it is possible to significantly reduce the effect of the variations in the positions of the ink discharging nozzles N. In addition, in order to improve the yield in the manufacturing processes of the line heads with a long shape, one line head can be manufactured by linking a plurality of heads in the Y direction. In this case, the positions of the ink discharging nozzles N deviate in the joints of the heads and streaks or the like can be generated in the printing image due to this effect, but according to the present embodiment, since it is possible for the streaks to be inconspicuous, it is particularly effective in a case of using line heads where a plurality of heads are bonded together. In addition, if the dot duty of the quasi-regular pattern is suppressed to 8/256, natural convergence to the blue noise characteristic is possible without large disturbances being generated in granularity. Furthermore, adopting the quasi-regular pattern and not the regular pattern contributes significantly to the natural convergence to the blue noise characteristic in the assignment of the thresholds which exceed 8.

C

Modified Examples

Each of the aspects described above can be modified in various ways. Specific examples of modified aspects are exemplified below. It is possible for two or more aspects which are arbitrarily selected from the following examples to be appropriately combined in a range where the aspects are not inconsistent with each other.

(1) Modified Example 1

In the second embodiment described above, the passes which are pass number 1 and pass number 3 are selected in a case where the gradation values of the image data are the predetermined value or less, but the invention is not limited to this. The selection of the passes can be determined in consideration of various elements.

For example, in a case where the gradation values are small, granularity of the dots is most conspicuous when there is bleeding in a case where dots are formed with a plurality of colors compared to when dots are formed with a single color. Specifically, this is the case of cyan dots and magenta dots on a yellow background. The case of the cyan dots is a case where cyan dots with a low duty are formed at the same time as yellow dots with a high duty. From the point of view of the stability of the shape of the cyan dots, whether it is better to form the cyan dots in a pass at an earlier stage when the yellow dots are spread out or to form the cyan dots in a pass at a later stage when the yellow dots cover the entire surface depends on the physical properties of the cyan ink and the yellow ink. Specifically, there can be changes in characteristics such as that it is easy for one ink to bleed into another ink or the like change due to the effect of the viscosity, the surface tension, or the like.

Figure 9:
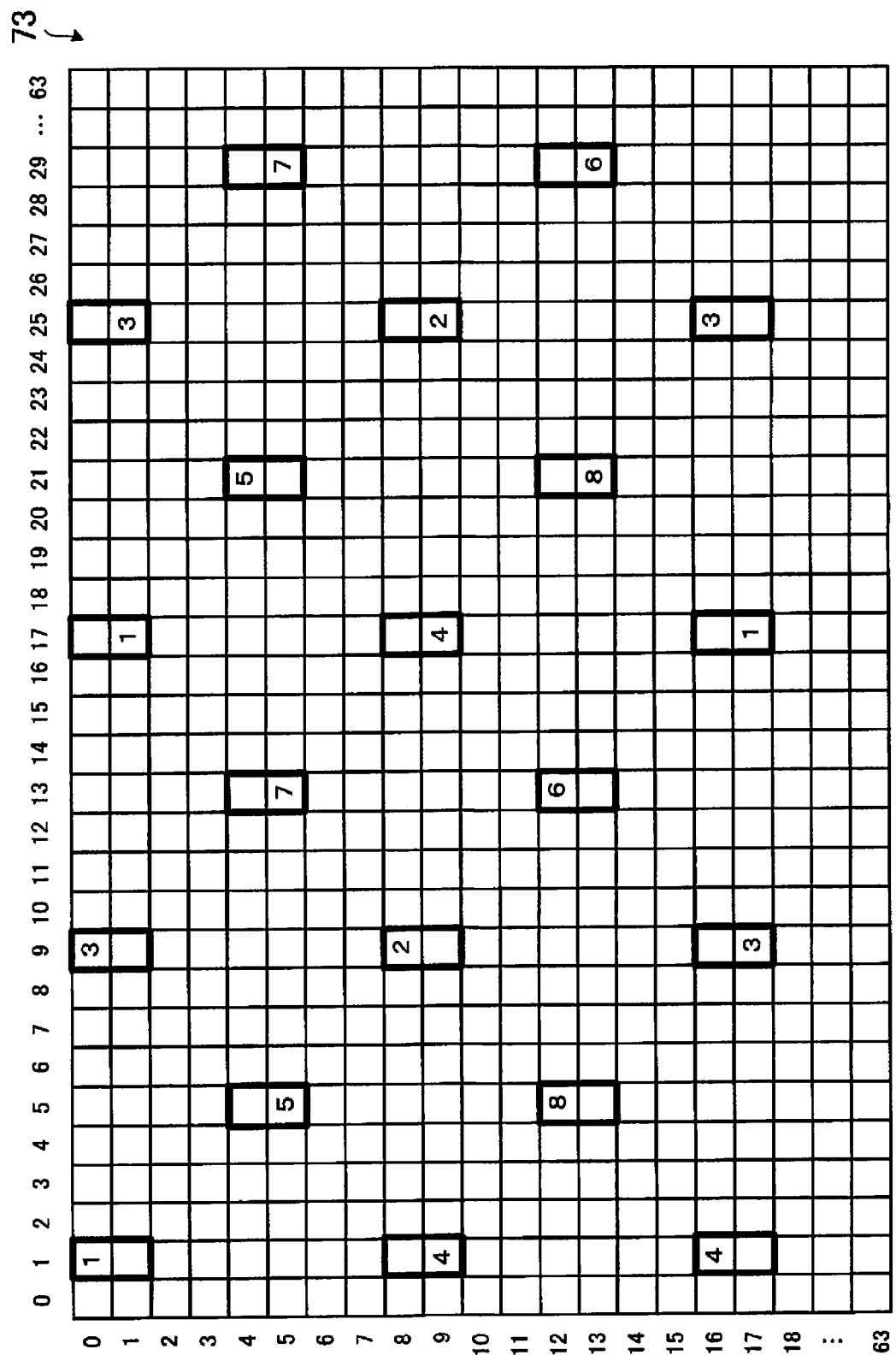
FIG. 9 is an explanatory diagram illustrating an example of a dither mask which is used in modified example 1.

For cases where forming the dots in an early pass is preferable, it is preferable to combine the passes which are pass number 1 and the pass number 3 as described in the second embodiment described above. On the other hand, for cases where forming the dots in a late pass is preferable, it is preferable to combine the passes which are pass number 6 and the pass number 8. In this case, it is sufficient to use a dither mask 73 shown in FIG. 9.

(2) Modified Example 2

Figure 10:
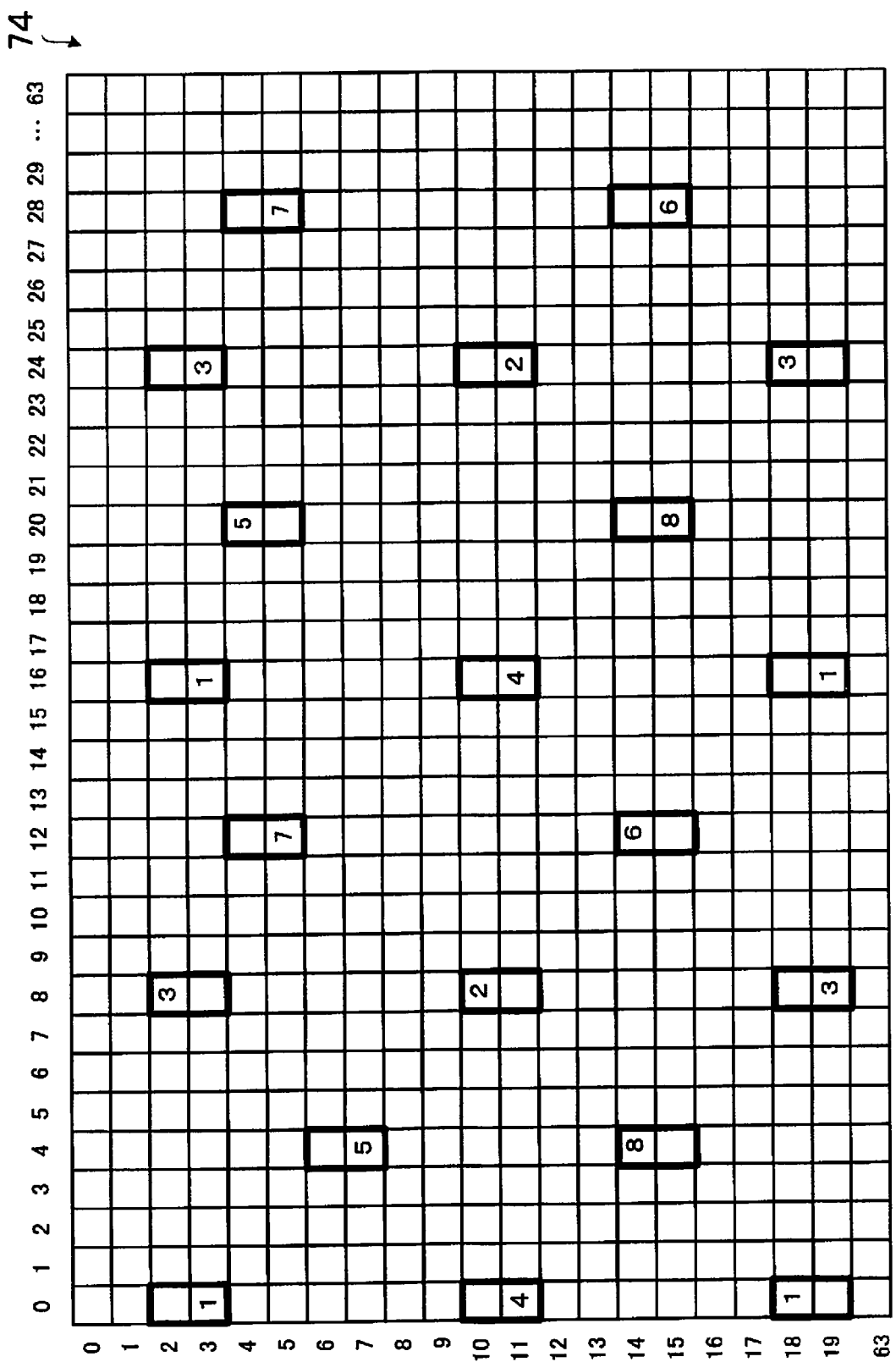
FIG. 10 is an explanatory diagram illustrating an example of a dither mask which is used in modified example 2.

In a case of scanning in both directions in the recording head 24 shown in FIG. 1, the order of the colors of the inks is reversed in the scanning in the X direction and the scanning in the −X direction. Scanning is performed with the odd numbered passes and the order is cyan→magenta→yellow→black in the scanning in the X direction, and scanning is performed with the even numbered passes and the order is black→yellow→magenta→cyan in the scanning in the −X direction. Typically, the shapes of the cyan dots are more stable where the scanning order of cyan is prior to yellow. This is because the bleeding is more significant for the cyan dots, which are formed by coming into contact with the yellow dots immediately after the yellow dots are formed when the yellow dots are formed first, than for the cyan dots which are formed without coming into contact. Accordingly, in this case, it is preferable to prioritize and use passes where the cyan precedes the yellow. Since the passes where the cyan is preceding are the odd numbered passes, it is more preferable to adopt a combination of pass number 5 and pass number 7 than of the passes which are pass number 6 and pass number 8 in a case of setting the subsequent pass order. In this case, it is sufficient to use a dither mask 74 shown in FIG. 10. In addition, since the order of the colors of magenta and yellow is the reverse of the case of cyan, it is preferable to use passes which are even numbered passes for the magenta ink. That is, a combination of the passes which are pass number 2 and pass number 4 is preferable in the early pass order and a combination of the passes which are pass number 6 and pass number 8 is preferable in the late order.

(3) Modified Example 3

Figure 11:
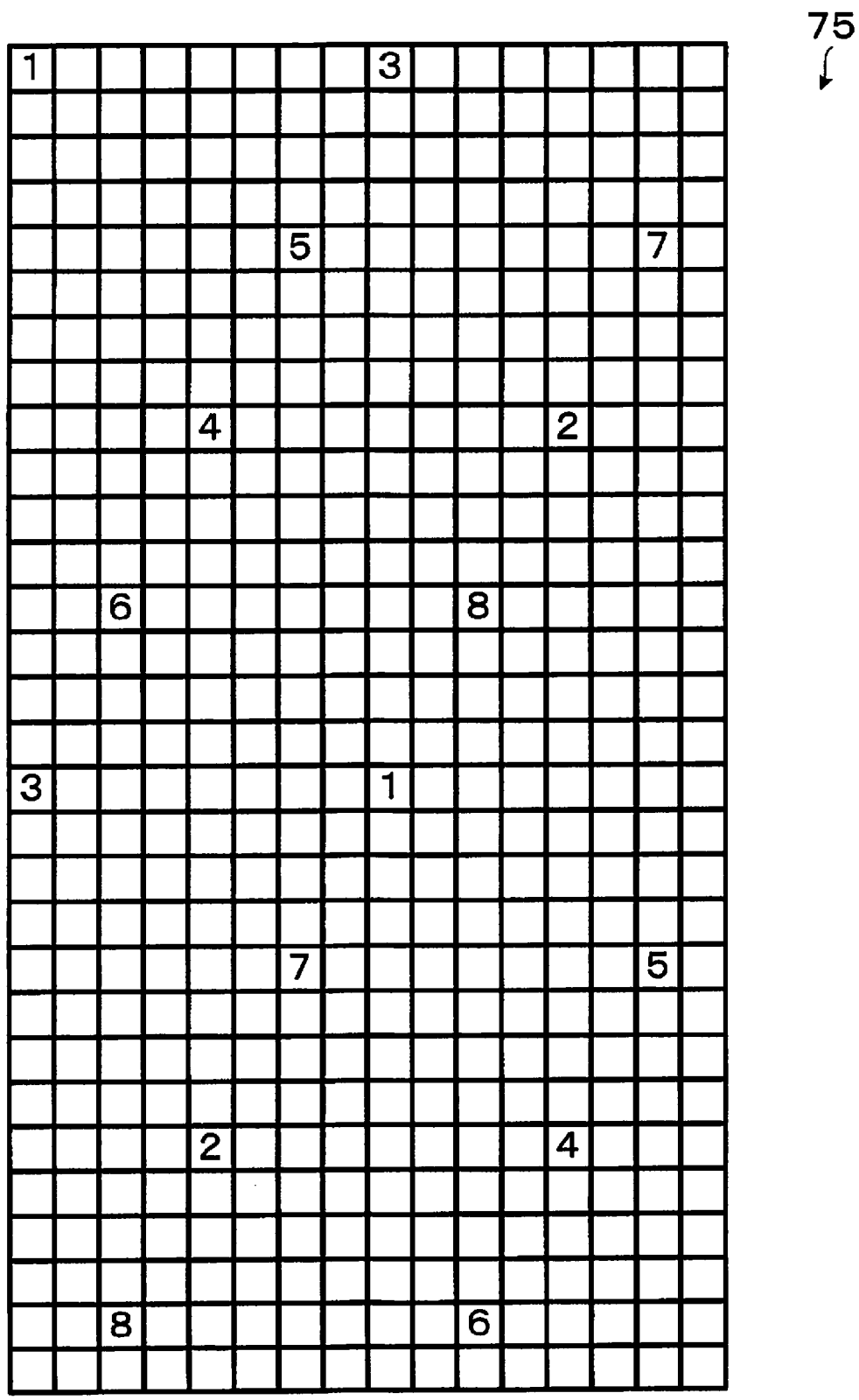
FIG. 11 is an explanatory diagram illustrating an example of a dither mask which is used in modified example 3.

In the first embodiment described above, the half-toning process is executed using the dither mask 71 which is provided with the regular pattern shown in FIG. 5 as the thresholds of the predetermined value or less, but the invention is not limited to this, and a dither mask 75 shown in FIG. 11 can be used. The dither mask 75 has a size of 16 pixels horizontally×32 pixels vertically. Even in this case, it is possible to form dots with gradation values of the predetermined value or less with the pass which is the pass number 1. Furthermore, by expanding the size of the dither mask 75 several times and adding a fluctuation of 1 pixel to the regular pattern, it is possible to generate a dither mask which forms dots of gradation values of the predetermined value or less using the passes which are pass number 1 and pass number 3 in the same manner as the second embodiment.

(4) Modified Example 4

In the embodiments described above, up to a dot duty of 8/256 was set as a regular pattern or a quasi-regular pattern, but it is possible to realize a sufficient effect even when up to a dot duty of 4/256 is set as a regular pattern or a quasi-regular pattern. In addition, it is possible for the dot duty which is set to 4/256 to move more smoothly to a blue noise mask. In addition, for the thresholds which exceed the predetermined value, the regions where the regular pattern or the quasi-regular pattern breaks down can have a green noise characteristic where the dots are moderately concentrated. Accordingly, for the gradation values which exceed the predetermined value in the dither mask 71, the thresholds for each of the printing pixels can be set such that the distribution of the dots which are formed on the printing medium approach the green noise characteristic along with increases in the gradation values. In addition, the regular pattern can be included in a portion thereof. In addition, the half-toning process is not limited to the systematic dither method, and the half-toning process can be switched from the dither method to error diffusion. For example, the half-toning is basically performed using the error diffusion method, but in a case where the input gradation values are 8/256 or less, it is sufficient that the determination result according to the dither method be adopted rather than the binary determination result according to the original error diffusion method and the error calculation and the error diffusion be performed based on the determination result according to the dither method. Due to this, when the dot duty exceeds 8/256, it is possible to realize half-toning which gradually approaches the original blue noise characteristic of the error diffusion method.

(5) Modified Example 5

In each embodiment described above, an example of a lateral printing system, where the scanning direction of the recording head 24 and the transport direction of the continuous sheet 20 which is the printing medium are matched, is described, but the invention is not limited to this and can be applied to a serial printing system where the scanning direction of the recording head 24 and the transport direction of the continuous sheet 20 which is the printing medium are perpendicular. In a typical serial system, the output is only completed for a partial region in pass 1 to pass 8 in the first embodiment and the subsequent regions are output by transporting the sheet and repeating pass 1 to pass 8 again.

(6) Modified Example 6

In the embodiment described above, the printing apparatus 100 which uses four colors of yellow, magenta, cyan, and black was described, but the invention is not limited to this and it is sufficient at least yellow and magenta are included or at least yellow and cyan are included.

What is claimed is:
1. A printing apparatus which performs printing on a printing medium, comprising:
a dot data generating section which generates dot data which indicates a dot formation state for each printing pixel in a printing image which is to be formed on the printing medium by performing a half-toning process with regard to image data which represents gradation values of each pixel which configures an original image; and
a printing image generating section which generates the printing image by forming dots at each of the printing pixels according to the dot data,
wherein the dot data generating section generates the dot data by using a dither mask where thresholds are set for the printing pixels and comparing the gradation values of the pixels which configure the original image and the thresholds for the printing pixels which are set in the dither mask, with the thresholds equal to a predetermined value or less being assigned in the dither mask such that the thresholds equal to the predetermined value or less are regularly arranged in the dither mask, and the thresholds exceeding the predetermined value being assigned in the dither mask such that the degree of regularity of the dots is reduced as the gradation values increase in a case where the gradation values which are represented by the image data exceed the predetermined value.

2. The printing apparatus according to claim 1, wherein, in a case where the gradation values which are represented by the image data exceed the predetermined value, the presence or absence of dot forming for each of the printing pixels is determined according to the gradation values of each of the pixels which configure the original image and the thresholds for each of the printing pixels which are set in the dither mask by using the dither mask where thresholds are set for each of the printing pixels in the half-toning process, and
for the gradation values which exceed the predetermined value, the thresholds for each of the printing pixels are set in the dither mask such that the distribution of the dots which are formed on the printing medium approaches a blue noise characteristic or a green noise characteristic as the gradation values increase.

3. The printing apparatus according to claim 1, wherein the printing image generating section forms a printing image on a printing medium using at least inks of each color of yellow, magenta, and cyan, and
the half-toning process is performed when forming dots of at least cyan or magenta.

4. A method of manufacturing printing material which manufactures printing material by forming a printing image on a printing medium, comprising:
generating dot data which indicates a dot formation state for each printing pixel of the printing image which is to be formed on the printing medium by performing a half-toning process with regard to image data which represents gradation values of each pixel which configures an original image; and
printing a printing image on the printing medium by forming dots at each of the printing pixels according to the dot data;
the generating of the dot data including generating the dot data by using a dither mask where thresholds are set for the printing pixels and comparing the gradation values of the pixels which configure the original image and the thresholds for the printing pixels which are set in the dither mask, with the thresholds equal to a predetermined value or less being assigned in the dither mask such that the thresholds equal to the predetermined value or less are regularly arranged in the dither mask, and the thresholds exceeding the predetermined value being assigned in the dither mask such that the degree of regularity of the dots is reduced as the gradation values increase in a case where the gradation values which are represented by the image data exceed the predetermined value, in the half-toning process.

5. A control method for a printing apparatus which performs printing on a printing medium, comprising:

generating dot data which indicates a dot formation state for each printing pixel of the printing image which is to be formed on the printing medium by performing a half-toning process with regard to image data which represents gradation values of each pixel which configures an original image; and printing a printing image on the printing medium by forming dots at each of the printing pixels according to the dot data, the generating of the dot data including generating the dot data by using a dither mask where thresholds are set for the printing pixels and comparing the gradation values of the pixels which configure the original image and the thresholds for the printing pixels which are set in the dither mask, with the thresholds equal to a predetermined value or less being assigned in the dither mask such that the thresholds equal to the predetermined value or less are regularly arranged in a dither mask, and the threshold exceeding the predetermined value being assigned in the dither mask such that the degree of regularity of the dots is reduced as the gradation values increase in a case where the gradation values which are represented by the image data exceed the predetermined value, in the half-toning process.

6. A non-transitory computer readable medium storing a control program for a printing apparatus which performs printing onto a printing medium and is provided with a printing image generating section, which generates a printing image by forming dots at each printing pixel, and a computer, by the computer functioning as a control unit, the control program comprising instructions for:

controlling a dot data generating section which generates dot data which indicate a dot formation state at each of the printing pixels of the printing image which is to be formed on the printing medium by performing a half-toning process with regard to image data which represents gradation values of each pixel which configures an original image and the printing image generating section so as to generate the printing image by forming dots at each of the printing pixels according to the dot data, wherein, in the half-toning process, the generating of the dot data includes generating the dot data by using a dither mask where thresholds are set for the printing pixels and comparing the gradation values of the pixels which configure the original image and the thresholds for the printing pixels which are set in the dither mask, with the thresholds equal to a predetermined value or less being assigned in the dither mask such that the thresholds equal to the predetermined value or less are regularly arranged in the diether dither mask, and the thresholds exceeding the predetermined value being assigned in the dither mask such that the degree of regularity of the dots is reduced as the gradation values are increased in a case where the gradation values which are represented by the image data exceed the predetermined value.

* * * * *